US011469646B2

(12) United States Patent
Payne et al.

(10) Patent No.: US 11,469,646 B2
(45) Date of Patent: Oct. 11, 2022

(54) OIL DISTRIBUTION IN A HYBRID MODULE

(71) Applicant: SCHAEFFLER TECHNOLOGIES AG & CO. KG, Herzogenaurach (DE)

(72) Inventors: Matthew Payne, Glenmont, OH (US); Ayyalraju Satyaseelan, Wooster, OH (US); Markus Steinberger, Macedonia, OH (US)

(*) Notice: Subject to any disclaimer, the term of this patent is extended or adjusted under 35 U.S.C. 154(b) by 890 days.

(21) Appl. No.: 16/029,992

(22) Filed: Jul. 9, 2018

(65) Prior Publication Data
US 2020/0014283 A1    Jan. 9, 2020

(51) Int. Cl.
H02K 9/19      (2006.01)
H02K 7/00      (2006.01)
B60K 6/48      (2007.10)
H02K 7/11      (2006.01)
B60K 6/40      (2007.10)

(52) U.S. Cl.
CPC .......... H02K 9/19 (2013.01); B60K 6/40 (2013.01); B60K 6/48 (2013.01); H02K 7/11 (2013.01); B60Y 2200/92 (2013.01); H02K 7/006 (2013.01)

(58) Field of Classification Search
CPC . H02K 9/19; H02K 7/11; H02K 7/006; B60K 6/48; B60K 2200/09; B60K 6/40; B60K 2200/92
See application file for complete search history.

(56) References Cited

U.S. PATENT DOCUMENTS

| 9,581,210 B2* | 2/2017 | Frait | B60K 6/48 |
| 2006/0144665 A1 | 7/2006 | Janson et al. | |
| 2013/0192949 A1* | 8/2013 | Frait | F16H 57/0445 |
| | | | 192/85.63 |
| 2015/0239336 A1 | 8/2015 | Kasuya et al. | |
| 2016/0084363 A1* | 3/2016 | Steinberger | F16H 45/00 |
| | | | 192/3.28 |
| 2017/0335795 A1* | 11/2017 | Klemen | F02C 7/06 |
| 2018/0058559 A1 | 3/2018 | Pyers et al. | |
| 2018/0238439 A1* | 8/2018 | Aulin | B60K 6/405 |
| 2019/0040917 A1* | 2/2019 | Persinger | F16H 61/143 |
| 2019/0337375 A1* | 11/2019 | Simon | B60K 6/387 |

FOREIGN PATENT DOCUMENTS

| JP | 2004-180477 | 6/2004 |
| JP | 2006-067777 | 3/2006 |
| JP | 2011-097784 | 5/2011 |
| JP | 2012-235546 A | 11/2012 |
| JP | 2013-146163 | 7/2013 |
| WO | WO-2014/051110 | 4/2014 |

OTHER PUBLICATIONS

U.S. Appl. No. 15/456,884, filed Mar. 13, 2017.

* cited by examiner

Primary Examiner — Gary A Nash

(57) ABSTRACT

A drive module for a vehicle includes an input extending along an axis and configured to be driven by an engine. An electric motor has a rotor carrier hub configured to be rotated about the axis. The rotor carrier hub is non-rotatably connected to a torque converter cover and is selectively coupled to the input via a clutch. The rotor carrier hub has an inner surface defining an interior, an outer surface defining an exterior, and a plurality of holes extending through the rotor carrier hub from the inner surface to the outer surface to enable oil to transfer from the interior to the exterior. This provides a controlled and relative constant oil flow for cooling the drive module.

20 Claims, 2 Drawing Sheets

OIL DISTRIBUTION IN A HYBRID MODULE

TECHNICAL FIELD

The present disclosure relates to improving oil distribution in a hybrid drive module of a vehicle. In particular, various structural features of a rotor carrier hub are provided to cool a motor stator and rotor using a single unidirectional oil flow supply path.

BACKGROUND

Hybrid modules are known in the art to selectively couple an engine to a transmission component (e.g., torque converter) via a clutch while providing the ability for an electric motor to also selectively provide power. The electric motor may operate in contact with oil, and the clutch may be a wet clutch also utilizing the oil. Cooling and lubrication of the electric motor, the clutch, and other components may be important for proper operation.

SUMMARY

According to one embodiment, a hybrid drive module includes an input extending along an axis and configured to be driven by an engine. A torque converter cover is provided. An electric motor has a rotor carrier hub configured to be rotated about the axis. The rotor carrier hub is non-rotatably connected to the torque converter cover and is selectively coupled to the input via a clutch. The rotor carrier hub has an inner surface defining an interior, an outer surface defining an exterior, and a plurality of holes extending through the rotor carrier hub from the inner surface to the outer surface to enable oil to transfer from the interior to the exterior.

In another embodiment, a rotor carrier hub for an electric motor includes a main body extending about an axis from a first axial side to a second axial side. The rotor carrier hub also has an inner surface defining an interior, an outer surface defining a plurality of channels extending in an axial direction, a lip extending radially outward from the outer surface at the second axial side and defining a reservoir at least partially bound by the outer surface and the lip, a first plurality of holes defined within the main body and extending in a radial direction from the inner surface to the outer surface, each of the first plurality of holes aligned with one of the channels to enable oil to transfer from the interior of the main body into the channels, and a second plurality of holes defined within the main body and extending in the radial direction from the inner surface to the outer surface. Each of the second plurality of holes are axially aligned with the reservoir to enable oil to transfer from the interior of the main body into the reservoir.

In yet another embodiment, an electric motor includes a rotor carrier hub configured to rotate about an axis and having an inner surface defining an interior, an outer surface, and a plurality of channels formed into outer surface extending partially through to the inner surface. The rotor carrier hub further includes a shoulder extending radially outward from the outer surface and axially overlapping a portion of the outer surface to define a reservoir configured to partially contain oil between the outer surface and the shoulder. The rotor carrier hub defines a first plurality of apertures extending entirely therethrough and each circumferentially aligned with a respective one of the channels. The rotor carrier hub defines a second plurality of apertures extending entirely therethrough and each axially aligned with each other and with the reservoir.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
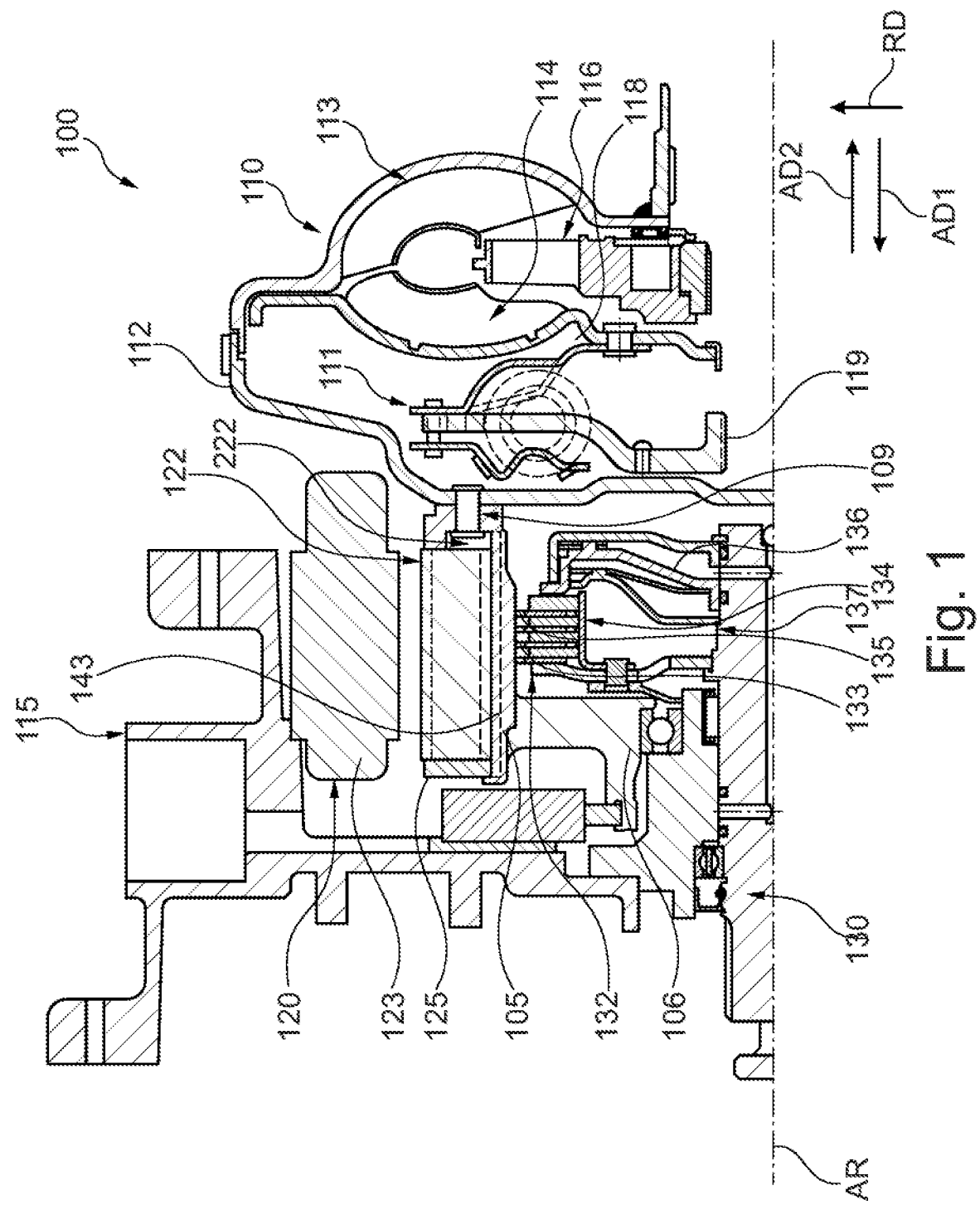
FIG. 1 is a cross-sectional view of a hybrid drive module for a hybrid vehicle, including an electric motor having a rotor and an associated rotor carrier hub, according to one embodiment.

FIG. 1 is a cross-sectional view of a hybrid drive module 100 for a hybrid vehicle. The hybrid drive module 100 (also referred to as module 100) may include the following components: an axis of rotation AR, a rotor carrier hub 105, a torque converter 110, a housing 115, an electric motor 120 that includes a rotor 122, a stator 123 and an end plate 125 on either end. The torque converter 110 may include a cover 112, an impeller 113, a turbine 114, and a stator 116. The rotor carrier hub 105 is described in further detail with respect to FIG. 2. The rotor carrier hub 105 is affixed to another component 106 with additional hardware in the assembly, or may be mated to one another; in another embodiment, the rotor carrier hub 105 and the other component may be a single component. The rotor carrier hub 105 may be connected, including in a non-rotatable fashion, to the cover 112 via one or more rivets 109, for example. The rotor 122 may be engaged with surface 107 and may be non-rotatably connected to the rotor carrier hub 105 by a spline connection 143, for example. The plate 125 may be engaged with the rotor 122.

The rotor carrier hub 105 may include other structural features, such as those described in U.S. patent application Ser. No. 15/456,884, which is hereby incorporated by reference in its entirety. For example, the rotor carrier hub 105 may include structure such as flanges, etc. to restrain the rotor 122 in direction AD1 and AD2

In one embodiment, the module 100 includes, or is arranged to engage, input 130 and includes a disconnect clutch 132 to selectively disconnect components downstream of the clutch 132 from input 130. In other words, the clutch 132 may selectively disconnect the engine from the motor 120. The input 130 may be a shaft or the like that is arranged to receive torque from, for example, an internal combustion engine (not shown). The clutch 132 may include at least one clutch plate 133 non-rotatably connected to rotor carrier hub 105, an inner carrier 134 non-rotatably connected to the input 130, and a clutch plate 135 non-rotatably connected to the inner carrier 134, and a piston plate 136 axially displaceable to open and close the clutch 132. In operation, axial movement of the piston plate 136 opens and closes the clutch 132 to selectively couple the input 130 to the cover 112. Thus, the module 100 can function in at least three modes. In a first mode, the clutch 132 is open and the electric motor 120 (via the rotor 122) is the only source of torque for the torque converter 110. In a second mode, the clutch 132 is closed, the electric motor 120 is not driving the torque converter 110, and the only source of torque for the torque converter 110 is the input part 130 via the disconnect clutch. In a third mode, the clutch 132 is closed and the motor 120 is used to provide torque to the input 130 to start the engine (not shown) operatively attached to the input 130.

For context, in one embodiment the torque converter 110 may include a torsional vibration damper 111 with an input part 118 connected to the turbine 114, an output part 119 arranged to connect to a transmission input shaft (not shown), and at least one spring 121 engaged with the input part 118 and the output part 119.

Oil, lubricant, transmission fluid, or the like (hereinafter generally referred to as oil) is provided in the module to cool the motor 120 and wet the clutch 132. The flow of oil is delivered to the module 100 from the transmission (not shown). This flow should be routed such that all the bearings in the system get adequate lube, the clutch 132 gets sufficient cooling, and the motor's rotor 122 and stator 123 are cooled. The module 100 may not be submerged but rather the module 100 should be considered a splash system such that the oil splashes throughout the operation of the module 100 to cool various components. It may be important to have oil-flow consistency in oil flowing past the rotor 122 after leaving the clutch 132 and sprayed outward on the windings of the stator 123, all while carrying enough cooling capacity to keep the system operating under desired conditions.

In one example of an oil flow path, the oil is transferred from the transmission to the module 100 through the interfaces between the housings. The oil is then channeled down to the input 130 of the module 100. Once the oil gets to the input, it is taken to the balance dam of the disconnect clutch 132 to fill the clutch. Once the clutch 132 is filled, the oil bleeds out of orifices 137 which direct the oil to the inner diameter of the clutch pack of the clutch 132. At this point, the oil has not absorbed any significant amounts of energy (heat). The oil then passes through the clutch 132 to cool the clutch if the clutch is slipping. Then, the oil passes into the inner surface of the rotor carrier hub 105.

According to embodiments disclosed herein, the rotor carrier hub 105 is provided with structural features to improve the oil flow and thus the operation of the module 100. The rotor carrier hub 105 is shown in isolation in FIG. 2. As will be described below, the rotor carrier hub 105 collects oil at its inner diameter surface, directs the oil radially outwardly through holes wherein some of the oil passes through channels which take the oil to one side of the rotor, and some of the oil passes to a reservoir on the opposite side of the rotor. The oil is then allowed to radially escape through slots on the rotor's end plates, cooling the rotor along the way.

Figure 2:
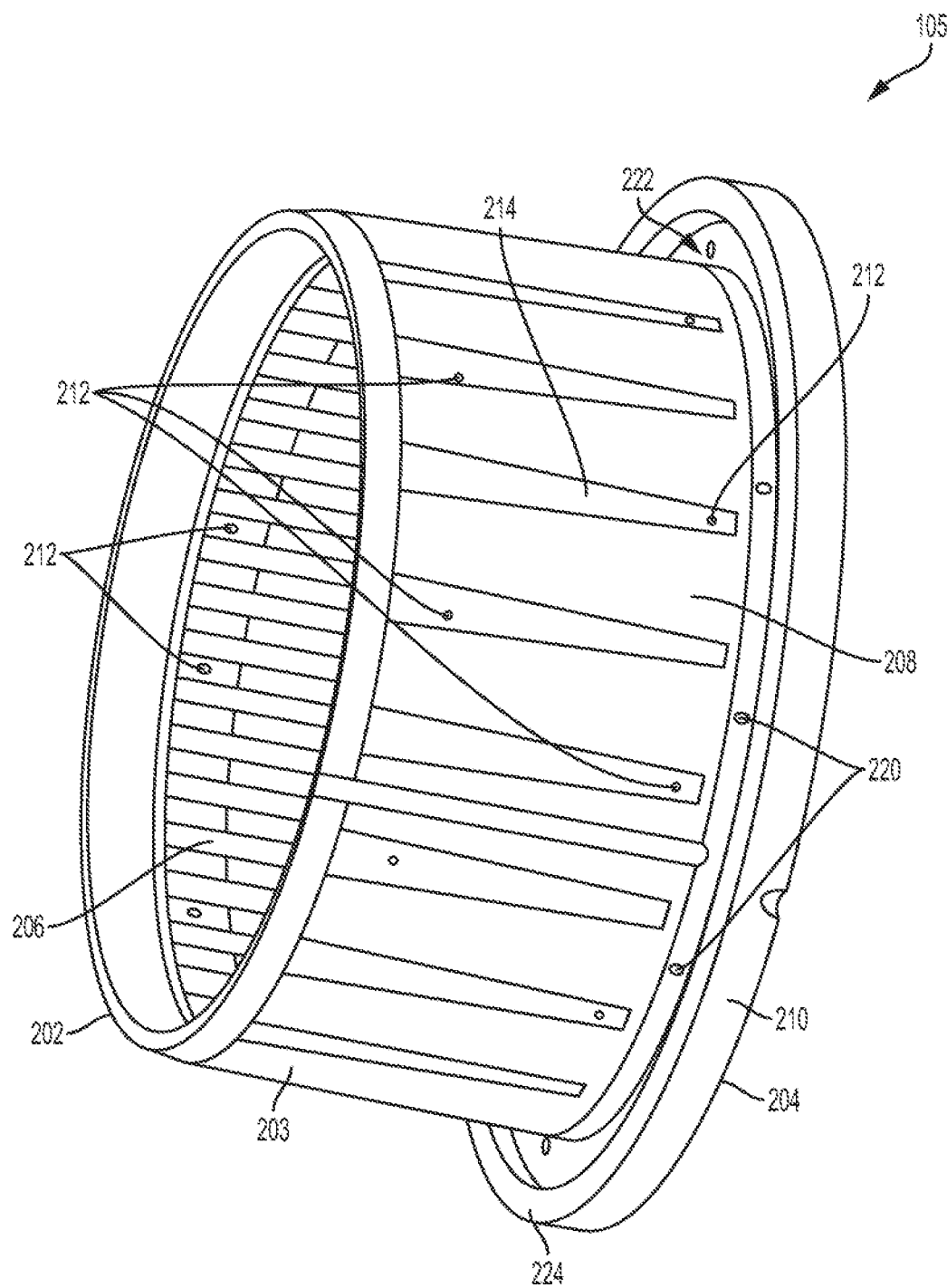
FIG. 2 is a perspective view of the rotor carrier hub, according to one embodiment.

According to the embodiment illustrated in FIG. 2, the rotor carrier hub 105 extends along the axis of rotation AR from a first side 202 to a second side 204. The rotor carrier hub 105 has a main body 203 that includes an inner surface 206 and an outer surface 208. An annular flange 210 is provided at the second side 204.

The oil passes from the clutch 132 to the inner surface 206 of the rotor carrier hub 105, as explained above. The oil is collected within the interior of the rotor carrier hub 105. The rotor carrier hub 105 defines a first plurality of holes 212 extending entirely therethrough, from the inner surface 206 to the outer surface 208. A controlled amount of the oil is therefore able to escape the interior of the rotor carrier hub 105, and is able to pass through to the outer surface 208.

The outer surface 208 is provided with a plurality of grooves or channels 214 that extend radially inward from the outer surface 208. The first plurality of holes 212 may each be located in a respective one of the channels such that oil escaping the interior of the rotor carrier hub 105 escapes into one of the channels 214. As can be seen in FIG. 2, the holes 212 can be located in axial alternating fashion, such that some of the holes 212 are located in the channels 214 toward the first side 202, and some of the holes 212 are located in the channels 214 toward the second side 204. And, each channel 214 may be provided with only one of the holes 212. Once escaped, the oil can travel along the channel. This alternating fashion allows for some of the oil escaping the interior of the rotor carrier hub 105 to pass in a first axial direction AD1 from the second side 204 toward the first side 202, while allowing for some of the oil escaping the interior of the rotor carrier hub 105 to pass in a second axial direction AD2 from the first side 202 toward the second side 204.

The rotor carrier hub 105 also defines a second plurality of holes 220. These holes 220 also extend entirely from the inner surface to the outer surface of the rotor carrier hub 105, allowing oil to escape the interior of the rotor carrier hub 105. These holes 220 may all be axially aligned with one another toward the second side 204 of the rotor carrier hub 105; the holes 220 may also be axially aligned with a reservoir 222 on the exterior of the rotor carrier hub 105 to allow oil to escape from the interior and into the reservoir 222. To define the reservoir 222, the rotor carrier hub 105 has the annular flange 210 extending radially outward relative to the second plurality of holes 220. The flange 210 also has a shoulder or lip 224 extending in the first axial direction AD1 toward the first side 202. Thus, the reservoir 222 is at least partially bound by the outer surface 208, the annular flange 210, and the lip 224.

Each of the second plurality of holes 220 may be located offset from the channels. In other words, each of the second plurality of holes 220 may be circumferentially offset or angularly offset about the axis relative to the first plurality of holes 212.

The oil escaping the interior of the rotor carrier hub 105 is thus able to travel to the rotor end plates, such as end plate 125 on one axial side of the rotor, and another end plate (not labeled) on the other axial side of the rotor. Each rotor end plate can have slots defined therein to allow the oil to radially escape the rotor. This oil contacts the rotor ends as it passes, pulling more heat from the rotor. Once the oil exits the slots in the end plates, it is sprayed from centrifugal force out onto the stator windings of the motor to cool the windings. Thus, a constant and controlled oil flow rate is provided, with the balance dam full of oil, the disconnect clutch cooled, and the motor stator and rotor cooled using a single unidirectional oil supply.

In an example embodiment, hub 105 is made of aluminum, which may be used to reduce the weight and rotational inertia of the hub, and cover 112 is made of steel, reducing the cost of manufacturing cover 112 and increasing the durability of cover 112. In another embodiment the carrier hub may be made from 4XXX (e.g., 4140) steel due to its high ductility behavior. In other embodiments, other materials may be used for the carrier hub, including but not limited to stainless steel or other metals and alloys, cast ductile iron, or other similar materials.

PARTS LIST

AR axis of rotation
RD radial direction
AD1 first axial direction
AD2 second axial direction
100 hybrid drive module
105 rotor carrier hub
106 component
107 surface
109 rivet
110 torque converter
111 torsional vibration damper
112 torque converter cover
113 impeller
114 turbine
115 housing
116 stator
118 input
119 output
120 electric motor
121 spring
122 rotor
123 stator
125 end plate
130 input
132 disconnect clutch
133 clutch plate
134 inner carrier
135 clutch plate
136 piston plate
143 spline connection
202 first side
203 main body
204 second side
206 inner surface
208 outer surface
210 annular flange
212 first plurality of holes
214 channels
220 second plurality of holes
222 reservoir
224 lip While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hybrid drive module comprising:
    an input extending along an axis and configured to be driven by an engine;
    a torque converter cover; and
    an electric motor having a rotor carrier hub configured to be rotated about the axis, the rotor carrier hub non-rotatably connected to the torque converter cover and selectively coupled to the input via a clutch, wherein the rotor carrier hub has an inner surface defining an interior, an outer surface defining an exterior, a plurality of holes extending through the rotor carrier hub from the inner surface to the outer surface to enable oil to transfer from the interior to the exterior, and an annular flange at one end of the rotor carrier hub surface.

2. The hybrid drive module of claim 1, wherein the outer surface of the rotor carrier hub defines a plurality of channels formed thereon, arranged annularly about the axis and extending in an axial direction.

3. The hybrid drive module of claim 2, wherein each of the holes are circumferentially aligned with a respective one of the channels such that fluid escaping the interior of the rotor carrier hub through the holes is guided along the channels of the outer surface.

4. The hybrid drive module of claim 3, wherein some of the plurality of holes are axially aligned with each other at a first axial location along the rotor carrier hub, and some of the plurality of holes are axially aligned with each other at a second axial location.

5. The hybrid drive module of claim 1, wherein the flange includes a radial-extending portion extending outward from the outer surface and an axially-extending portion extending toward a second end of the rotor carrier hub.

6. The hybrid drive module of claim 5, wherein the outer surface of the rotor carrier hub and at least portions of the flange define a fluid reservoir configured to partially enclose fluid.

7. The hybrid drive module of claim 6, wherein the rotor carrier hub defines a second plurality of holes extending entirely therethrough and axially aligned with the fluid reservoir to fluidly couple the interior to the reservoir.

8. The hybrid drive module of claim 7, wherein each of the second plurality of holes are circumferentially offset about the axis from the plurality of holes.

9. A rotor carrier hub for an electric motor, the rotor carrier hub comprising:
    a main body extending about an axis from a first axial side to a second axial side and having an inner surface defining an interior,
    an outer surface defining a plurality of channels extending in an axial direction,
    an annular flange on one side of the rotor carrier hub, the flange including a lip extending radially outward respective to the outer surface and defining a reservoir at least partially bound by the outer surface, the annular flange, and the lip,
    a first plurality of holes defined within the main body and extending in a radial direction from the inner surface to the outer surface, each of the first plurality of holes aligned with one of the channels to enable oil to transfer from the interior of the main body into the channels, and a second plurality of holes defined within the main body and extending in the radial direction from the inner surface to the outer surface, each of the second plurality of holes axially aligned with the reservoir to enable oil to transfer from the interior of the main body into the reservoir.

10. The rotor carrier hub of claim 9, wherein the lip has a radially-extending portion extending radially outward from the outer surface, and an axially-extending portion extending from the radially-extending portion and toward the first axial side.

11. The rotor carrier hub of claim 10, wherein the second plurality of holes are axially aligned with the axially-extending portion.

12. The rotor carrier hub of claim 9, wherein the first plurality of holes defines a first group of holes axially aligned at first axial location closer to the first axial side than the second axial side, and a second group of holes axially aligned at a second axial location closer to the second axial side than the first axial side.

13. The rotor carrier hub of claim 9, wherein each of the second plurality of holes is angularly offset about the axis relative to the first plurality of holes.

14. The rotor carrier hub of claim 9, wherein the first plurality of holes and the second plurality of holes are arranged in an annular array about the axis.

15. An electric motor comprising:
 a rotor carrier hub configured to rotate about an axis and having an inner surface defining an interior, an outer surface, and a plurality of channels formed into outer surface extending partially through to the inner surface, the rotor carrier hub further including an annular flange at one end of the rotor carrier hub, the annular flange including a shoulder extending radially outward from the outer surface and axially overlapping a portion of the outer surface to define a reservoir configured to partially contain oil between the outer surface and the shoulder; wherein the rotor carrier hub defines a first plurality of holes extending entirely therethrough and each circumferentially aligned with a respective one of the channels; and wherein the rotor carrier hub defines a second plurality of holes extending entirely therethrough and each axially aligned with each other and with the reservoir.

16. The electric motor of claim 15, wherein the shoulder includes a radially-extending portion extending radially outward from the outer surface, and the shoulder includes an axially-extending portion extending in an axial direction from the radially-extending portion.

17. The electric motor of claim 16, wherein the second plurality of holes are axially aligned with the axially-extending portion of the shoulder.

18. The electric motor of claim 15, wherein the rotor carrier hub extends from a first axial side to a second axial side, the first plurality of holes are located closer to the first axial side, and the second plurality of holes are located closer to the second axial side.

19. The electric motor of claim 15, wherein the rotor carrier hub is non-rotatably connected to a torque converter cover and is selectively coupled to an input shaft via a clutch.

20. The electric motor of claim 15, wherein the first plurality of holes are identical in size and are axially aligned with each other.

\* \* \* \* \*